US012725362B2

(12) United States Patent
Ewald et al.

(10) Patent No.: US 12,725,362 B2
(45) Date of Patent: Sep. 1, 2026

(54) LATTICE STRUCTURES WITH GENERATED SURFACE PATTERNS

(71) Applicant: Peridot Print LLC, Palo Alto, CA (US)

(72) Inventors: Brent Charles Ewald, Vancouver, WA (US); Geoffrey Franklin Schmid, Vancouver, WA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 448 days.

(21) Appl. No.: 18/272,649

(22) PCT Filed: Jan. 29, 2021

(86) PCT No.: PCT/US2021/015871
§ 371 (c)(1),
(2) Date: Jul. 17, 2023

(87) PCT Pub. No.: WO2022/164452
PCT Pub. Date: Aug. 4, 2022

(65) Prior Publication Data
US 2024/0296630 A1 Sep. 5, 2024

(51) Int. Cl.
*G05B 19/042* (2006.01)
*G06T 19/00* (2011.01)

(52) U.S. Cl.
CPC .......... *G06T 19/00* (2013.01); *G05B 19/0426* (2013.01); *G06T 2210/21* (2013.01)

(58) Field of Classification Search
CPC .. G06T 19/00; G06T 2210/21; G05B 19/0426
See application file for complete search history.

(56) References Cited

U.S. PATENT DOCUMENTS

| | | | |
|---|---|---|---|
| 7,907,793 B1 | 3/2011 | Sandrew | |
| 9,345,280 B2 | 5/2016 | Selvarajan | |
| 9,596,899 B2 | 3/2017 | Stahl et al. | |
| 10,650,539 B2 | 5/2020 | Yan et al. | |
| 10,706,636 B2 | 7/2020 | Selvarajan et al. | |
| 2010/0156901 A1 | 6/2010 | Park et al. | |
| 2014/0267279 A1 | 9/2014 | Kontkanen | |
| 2014/0279177 A1* | 9/2014 | Stump ................ | G06Q 30/0611 705/26.4 |
| 2015/0358612 A1 | 12/2015 | Sandrew et al. | |
| 2018/0025547 A1 | 1/2018 | Alun-Jones et al. | |
| 2020/0160597 A1 | 5/2020 | Chen et al. | |

* cited by examiner

*Primary Examiner* — Gary Collins
(74) *Attorney, Agent, or Firm* — Michael Dryja

(57) ABSTRACT

According to examples, machine-readable instructions in a computer-readable medium may cause a processor to access a digital model of a 3D object including a lattice structure formed of structural elements. The processor may also generate a 2D map of a surface of the digital model, calculate locations at which the structural elements in the lattice structure intersect with the 2D map of the surface, generate a 2D image including the calculated locations and a perimeter of the 2D map of the surface, and generate a pattern onto the 2D image, in which the generated pattern connects and covers a plurality of the calculated locations. The processor may further convert the 2D image with the generated pattern into a 3D surface of the digital model and modify the digital model of the 3D object to include the generated pattern.

17 Claims, 5 Drawing Sheets

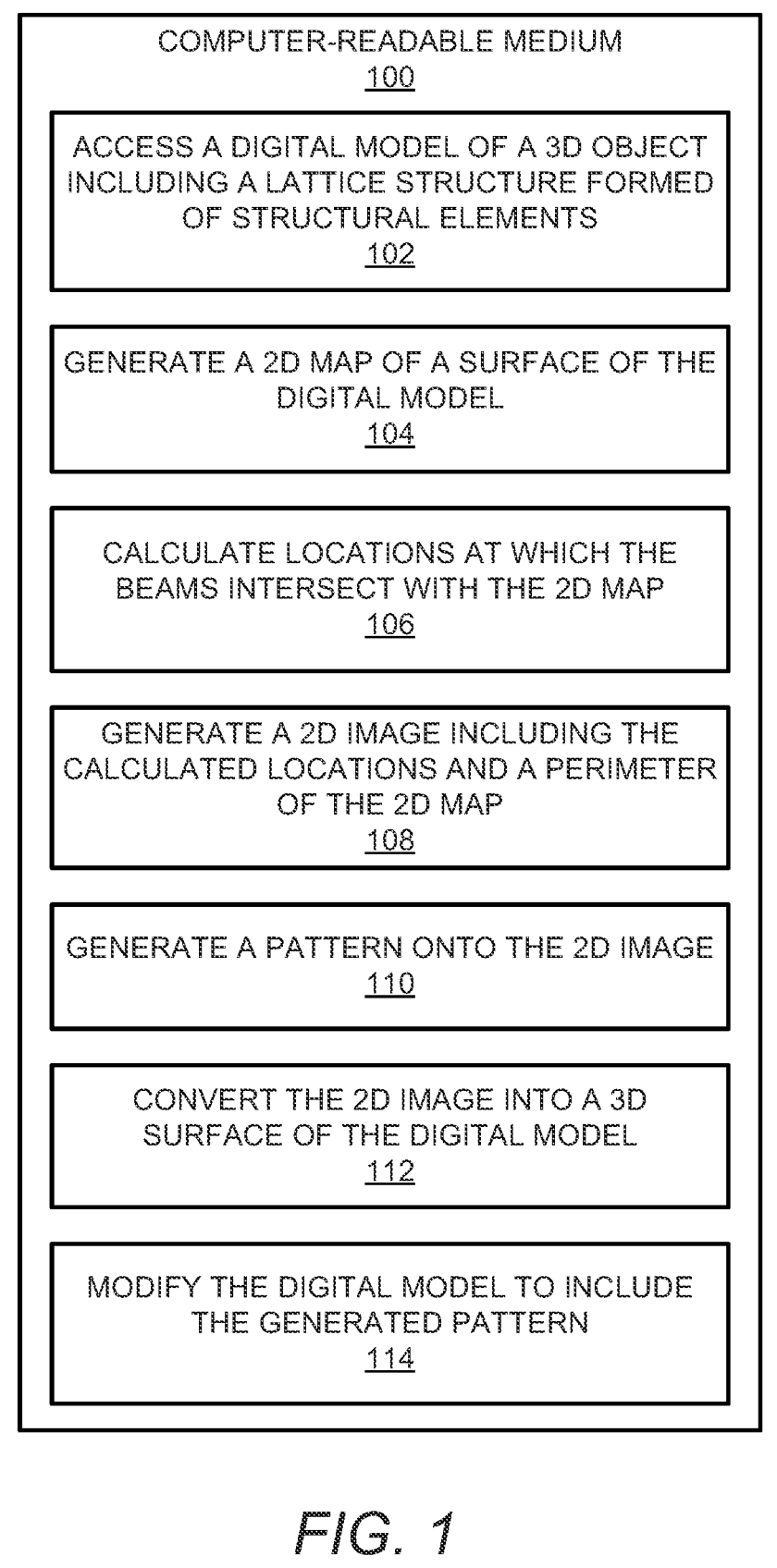

COMPUTER-READABLE MEDIUM
100

ACCESS A DIGITAL MODEL OF A 3D OBJECT INCLUDING A LATTICE STRUCTURE FORMED OF STRUCTURAL ELEMENTS
102

GENERATE A 2D MAP OF A SURFACE OF THE DIGITAL MODEL
104

CALCULATE LOCATIONS AT WHICH THE BEAMS INTERSECT WITH THE 2D MAP
106

GENERATE A 2D IMAGE INCLUDING THE CALCULATED LOCATIONS AND A PERIMETER OF THE 2D MAP
108

GENERATE A PATTERN ONTO THE 2D IMAGE
110

CONVERT THE 2D IMAGE INTO A 3D SURFACE OF THE DIGITAL MODEL
112

MODIFY THE DIGITAL MODEL TO INCLUDE THE GENERATED PATTERN
114

FIG. 1

LATTICE STRUCTURES WITH GENERATED SURFACE PATTERNS

BACKGROUND

Many types of articles may have lattice structures that may be designed to mimic other types of materials. For instance, the lattice structures may have properties that may mimic a relatively softer or more flexible material than the material used to form the lattice structures. The structural elements of the lattice structures that cross through boundaries of the volumes of the articles may be cut to preserve the boundaries, exposing the ends of the structural elements.

BRIEF DESCRIPTION OF DRAWINGS

Features of the present disclosure are illustrated by way of example and not limited in the following figure(s), in which like numerals indicate like elements, in which:

FIG. 1 shows a block diagram of an example computer-readable medium that may have stored thereon computer-readable instructions for modifying a digital model of a 3D object to include a generated pattern;

DETAILED DESCRIPTION

Figure 2A:
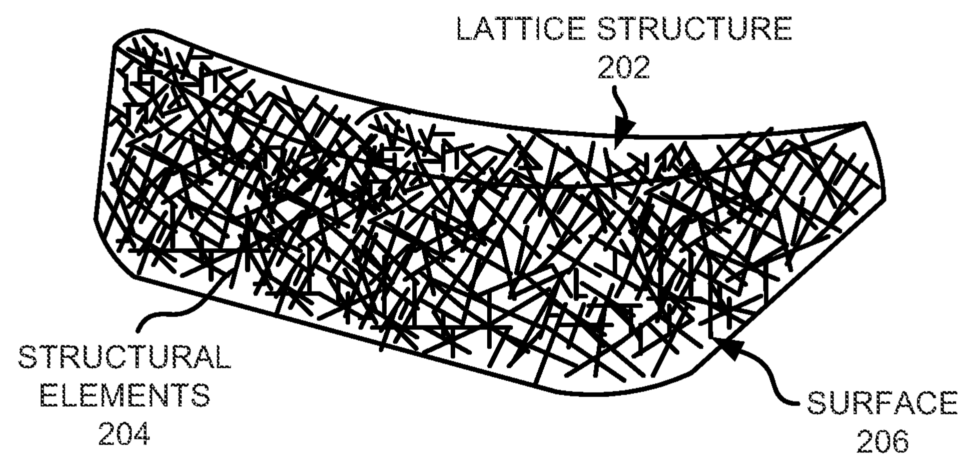
FIGS. 2A-2E, respectively, show diagrams of various stages during modification of the digital model depicted in FIG. 1.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms “a” and “an” are intended to denote at least one of a particular element. As used herein, the term “includes” means includes but not limited to, the term “including” means including but not limited to. The term “based on” means based at least in part on.

Disclosed herein are computer-readable media, methods, and apparatuses that may modify the digital model of a 3D object that includes a lattice structure formed of structural elements. The ends of some of the structural elements may be exposed as may occur when the structural elements are cut to preserve a volume of the digital model. As disclosed herein, a processor may modify the digital model to cause the digital model to include a generated pattern that connects and covers a plurality of exposed ends of the structural elements. The generated pattern may be any type of pattern, such as a certain arrangement of text, a certain geometric pattern, a logo, an image, and/or the like.

According to examples, the processor may execute a set of instructions to incorporate the pattern onto the digital model of the 3D object by applying the pattern onto a 2D map of a surface of the digital model. Particularly, the processor may generate a 2D map, e.g., a UV map, of a surface of the digital model and may calculate locations at which the structural elements in the lattice structure intersect with the 2D map of the surface. The processor may also generate a 2D image that may include the calculated locations and a perimeter of the 2D map of the surface. The processor may further generate a pattern onto the 2D image, in which the generated pattern may connect and cover a plurality of the calculated locations. The processor may convert the 2D image with the generated pattern into a 3D surface of the digital model and may modify the digital model of the 3D object to include the generated pattern.

Through the generation and/or incorporation of a pattern onto a surface of the 3D object as discussed in the present disclosure, increased structural support may be provided to a 3D object having exposed ends of a lattice structure. In addition, the pattern may be generated to provide increased support in one direction as compared with another direction. Furthermore, the pattern may be incorporated to provide visible information, a company’s logo, a design, and/or the like, and may thus provide an aesthetic function.

Reference is first made to FIGS. 1 and 2A-2C. FIG. 1 shows a block diagram of an example computer-readable medium 100 that may have stored thereon computer-readable instructions for modifying a digital model of a 3D object to include a generated pattern. As discussed herein, a 3D fabrication system, such as a 3D printer, may fabricate a 3D object according to the modified digital model. FIGS. 2A-2E, respectively, show diagrams of various stages during modification of the digital model depicted in FIG. 1. It should be understood that the computer-readable medium 100 and the diagrams depicted in FIGS. 2A-2E may include additional features and that some of the features described herein may be removed and/or modified without departing from the scopes of the computer-readable medium 100 and/or the various stages depicted in FIGS. 2A-2E. In addition, it should clearly be understood that the digital model 200 is depicted in FIG. 2A as having certain features for purposes of illustration and should not be construed as limiting the present disclosure to those features.

Figure 4:
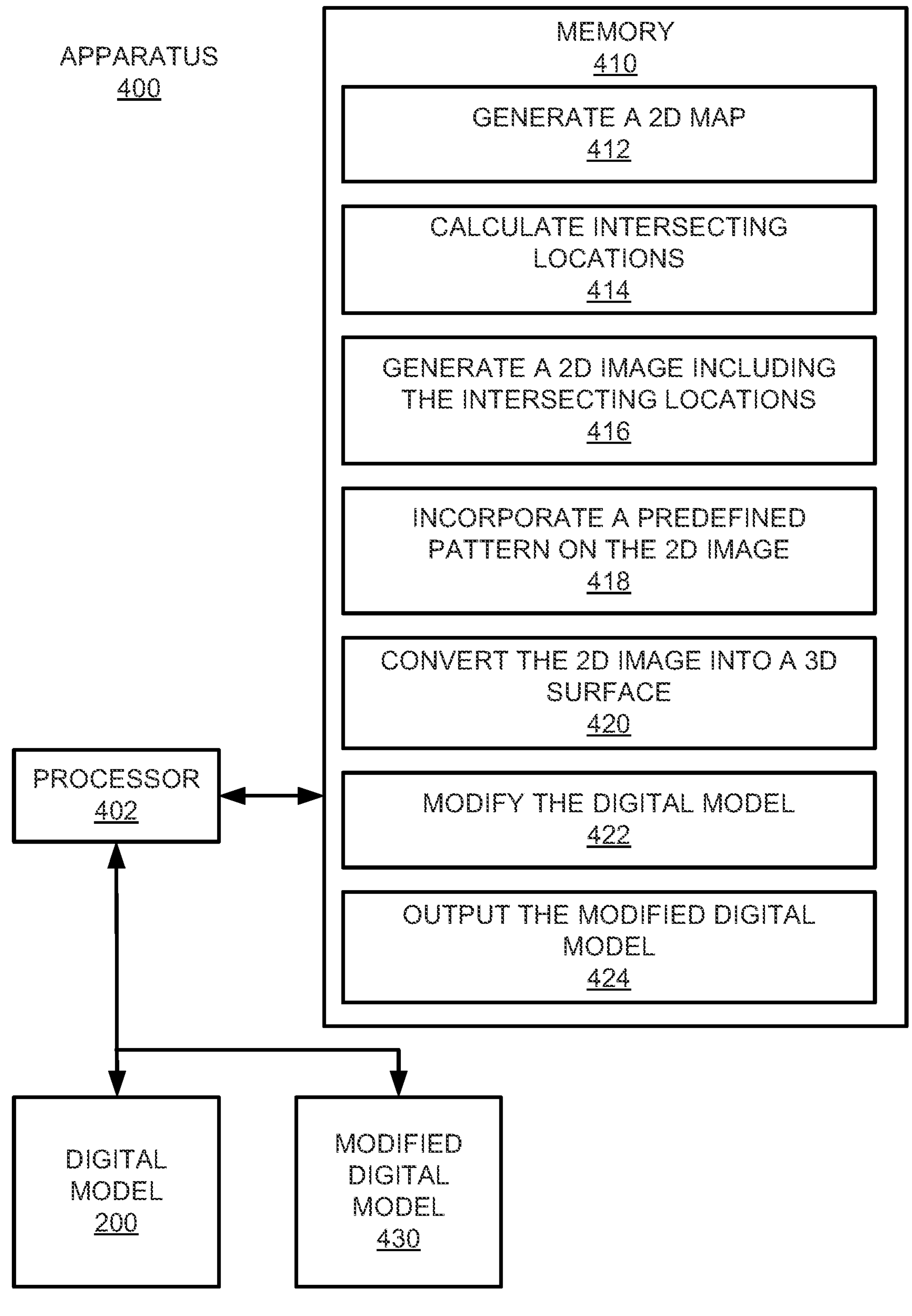
FIG. 4 depicts an example apparatus that may modify a digital model of a 3D object to include a generated pattern and may output the modified digital model.

The computer-readable medium 100 may have stored thereon computer-readable instructions 102-114 that a processor, such as the processor 402 depicted in FIG. 4, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. The computer-readable medium 100 may be a non-transitory computer-readable storage medium, where the term “non-transitory” does not encompass transitory propagating signals.

As shown in FIGS. 1 and 2A, the computer-readable medium 100 may include instructions 102 that may cause a processor 402 to access a digital model 200 of a 3D object. As discussed herein, a 3D fabrication system may fabricate the 3D object based on the digital model 200. The digital model 200 may be, for instance, a set of computer-readable instructions such as a computer-aided design (CAD) file, a print-ready file (such as a 3D manufacturing format (3MF) file, a STL file), and/or the like. In any regard, the processor 402 may access the digital model 200 from a local data store (not shown), from a remote data store (not shown), from a user, and/or the like.

As shown in FIG. 2A, the digital model 200 of the 3D object may include a lattice structure 202 that is formed of a plurality of interconnecting structural elements 204. The structural elements 204 may be beams, struts, joists, braces, and/or the like. Generally speaking, the lattice structure 202 may include any suitable type of a non-solid interior, such as a lattice configuration, in which interconnecting structural elements 204 being beams are one example of a suitable lattice structure 202. The lattice structure 202 may have repeating unit cells or may have cells having various dimensions with respect to each other. In any regard, the 3D object may be any suitable type of device that may include a lattice structure 202. Examples of the 3D object may include a footwear, a portion of a footwear (such as a midsole, an insole, a heel counter support, and/or the like), a helmet, a bicycle seat, car seat, a backpack pad, an orthotic device, and/or the like.

The computer-readable medium 100 may also include instructions 104 that may cause the processor 402 to generate a two-dimensional (2D) map of a surface 206 of the digital model 200. Although particular reference is made to a particular surface 206 of the digital model 200, it should be understood that the following discussion may equally be applicable to multiple surfaces of the digital model 200.

The processor 402 may generate the 2D map 210 (e.g., FIG. 2B) of the surface 206 of the digital model 200 through implementation of any suitable type of 2D mapping operation on the surface 206. For instance, the processor 402 may generate a UV map of the surface 206. The UV map may be a flat representation of the surface 206, in which the "U" and the "V" refer to the horizontal and vertical axes of the 2D space. As shown, the 2D map 210 may include a plurality of tiles 212 that may identify coordinates of various sub-areas on the 2D map 210 with respect to the 3D surface 206.

Generally speaking, the ends 208 of some of the structural elements 204 of the lattice structure 202 may not be connected to other structural elements 208 and may thus be in free space. This may occur as some of the structural elements 204 may be cut to preserve the volume of the digital model 200. The surface 206 of the digital model 200 may correspond to a plane at which the ends 208 of the structural elements 204 terminate and thus, the 2D map 210 may include depictions of the ends 208 of the structural elements 204 that may not connect to other structural elements 208.

Figure 2B:
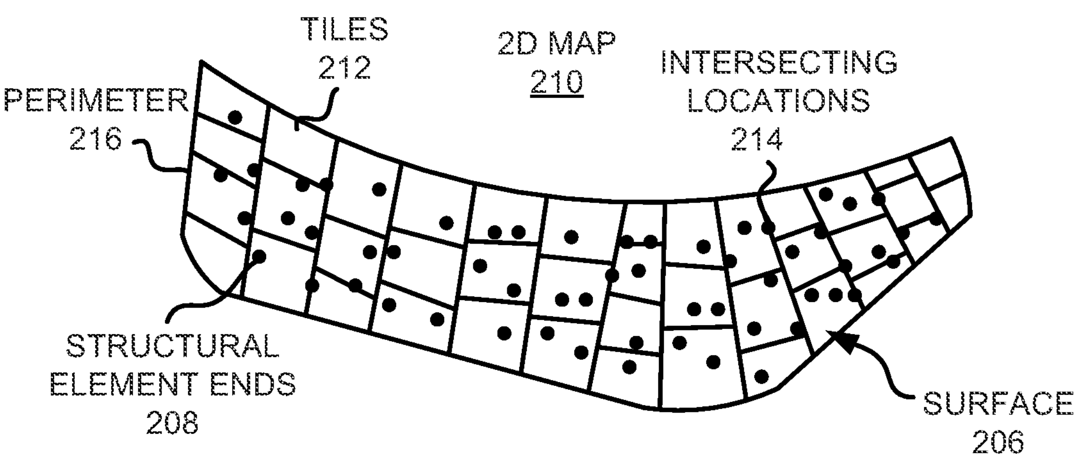
Figure 2C:
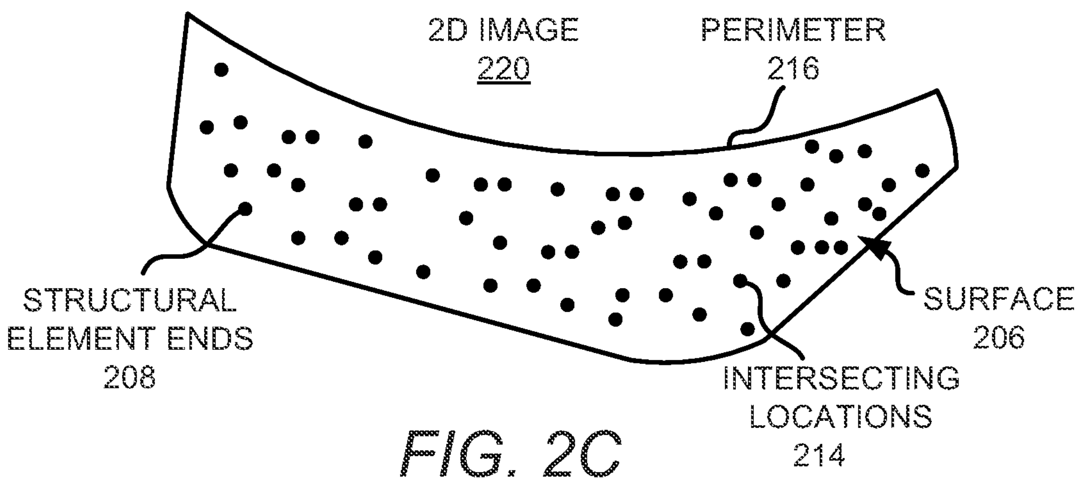
Figure 2D:
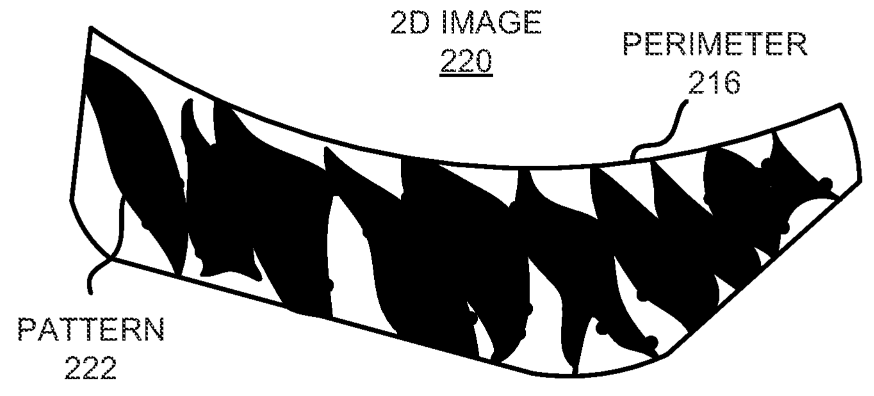
Figure 2E:
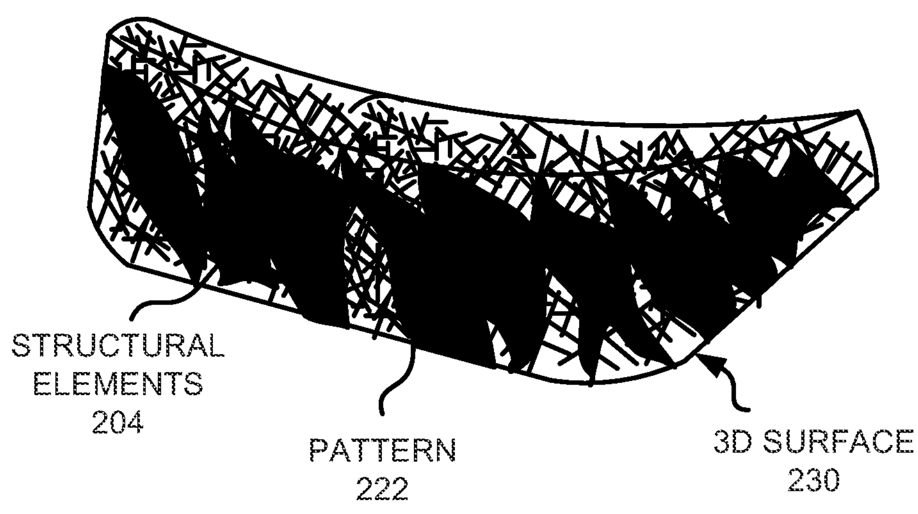

The computer-readable medium 100 may include instructions 106 that may cause the processor 402 to calculate locations 214 at which the structural elements 204 in the lattice structure 202 intersect with the 2D map 210 of the surface 206. That is, the processor 402 may execute the instructions 106 to calculate the locations 214 at which the ends 208 of the structural elements 204 terminate with respect to the 2D map 210 as shown in FIG. 2B. The processor 402 may execute any suitable technique to calculate the intersecting locations 214. The processor 402 may also determine the location of a perimeter 216 of the 2D map 210. In addition, the processor 402 may determine the positions of the intersecting locations 214 with respect to the perimeter 216.

The computer-readable medium 100 may include instructions 108 that may cause the processor 402 to generate a 2D image 220 (e.g., FIG. 2C) including the calculated intersecting locations 214 and the perimeter 216 of the 2D image 220. That is, for instance, the processor 402 may execute the instructions 108 to convert the coordinates (e.g., UV coordinates) of the perimeter 216 of the surface 206 and the intersecting locations 214 as indicated in the 2D map 210 into the 2D image 220. In addition, the processor 402 may make this conversion to have an arbitrary scale with the background of the 2D image 220 being white and the intersecting locations 214 being black (or the background being black and the intersecting locations 214 being white. In other examples, the background and the intersecting locations 214 may have other colors.

The computer-readable medium 100 may include instructions 110 that may cause the processor 402 to generate a pattern 222 (FIG. 2D) onto the 2D image 220. According to examples, the pattern 222 may connect and cover a plurality of intersecting locations 214. In addition, the pattern 222 may include elements that may connect sets of the intersecting locations 214 with the perimeter 216 of the 2D image 220. In this regard, the ends 208 of the structural elements 204 may terminate along portions of the pattern 222.

The pattern 222 may include any suitable decorative and/or functional shape. For instance, the pattern 222 may correspond to a particular type of pattern, such as a tiger stripe pattern, a geometrical pattern, a person's face, a logo, text, a machine-readable code (e.g., a bar code, a QR code) and/or the like. The pattern 222 may also include a predefined pattern, such as a certain arrangement of text, a certain geometrical pattern, etc. In any of these examples, the pattern 222 may provide structural support to the ends 208 of the structural elements 204 as well as to the 3D object itself, while also providing cosmetic features. In some examples, the pattern 222 may be arranged to provide greater structural support along one direction (e.g., the vertical direction) than another direction (e.g., the horizontal direction). By way of particular example, the lattice structure 202 may have greater stiffness (or other characteristic) in a first direction and the pattern 222 may be arranged to provide greater stiffness (or other characteristic) in a second direction, e.g., the second direction may be perpendicular to the first direction.

The processor 402 may generate the pattern 222 through implementation of any suitable technique. According to an example, the processor 402 may generate the pattern 222 through implementation of neural style transfer. Particularly, for instance, the processor 402 may generate the pattern through neural style transfer using generative adversarial networks (e.g., machine learning) combined with an appropriate style image. The style image may be any of the patterns 222 discussed herein and may be black and white, grayscale, and/or have colors. In addition or in other examples, the processor 402 may generate the pattern through triangulation, manually input design, and/or the like. Triangulation may include tessellation of points in 2D space at which point any image or texture may be superimposed on top of the ends 208 of the structural elements 204.

The computer-readable medium 100 may include instructions 112 that may cause the processor 402 to convert the 2D image 220 with the generated pattern 222 into a 3D surface 206 of the digital model 200. The processor 402 may convert the 2D image 220 by applying the 2D image 220 to the surface 206 through the previously generated 2D map 210. The processor 402 may use the coordinates in the 2D map 210 to convert the 2D image 220 back to the 3D surface 206 in the digital model 200.

According to examples, the processor 402 may apply a thickness or multiple thicknesses to the pattern 222 during or following conversion of the 2D image 220 into the 3D surface 206. In some examples, the processor 402 may apply a common thickness across the pattern 222. In other examples, the processor 402 may apply multiple thicknesses across the pattern 222 such that, for instance, the pattern 222 may have a textured surface. The thicknesses may correspond to various features of the pattern 222. For instance, the pattern 222 may include multiple colors and each of the colors may correspond to a particular thickness. As another example, the pattern 222 may include a plurality of grayscale values and each of the grayscale values may correspond to a particular thickness. In any of these examples, the thicknesses of the pattern 222 may range from about 0.5 mm to about 1.5 mm. The thicknesses of the pattern 222 may depend upon an aesthetic and/or a physical property afforded by the pattern 222.

The computer-readable medium 100 may include instructions 114 that may cause the processor 402 to modify the digital model 200 of the 3D object to include the generated pattern 122. That is, the processor 402 may modify the computer-readable instructions corresponding to the digital model 200 such that the digital model 200 may include the generated pattern 122 on the surface 206. The processor 402 may also process the digital model 200 such that a 3D fabrication system may use the modified digital model 430 (e.g., FIG. 4) to fabricate the 3D object. By way of example, the processor 402 may mesh the modified digital model 430, convert the modified digital model 430 into a STL file, 3MF file, and/or the like.

The computer-readable medium 100 may further include instructions that may cause the processor 402 to output the modified digital model 200. For instance, the processor 402 may output the modified digital model 200 to a 3D fabrication system (not shown). In some examples, the processor 402 may output the modified digital model 200 as a file to the 3D fabrication system and the 3D fabrication system may fabricate the 3D object from the file. In other examples, the processor 402 may output the modified digital model 200 to control the 3D fabrication system to fabricate the 3D object using the modified digital model 200.

In any of the examples discussed herein, fabrication components in the 3D fabrication system (not shown) may fabricate the 3D object to include the pattern 222 according to the modified digital model 430. The 3D fabrication system, which may be an additive manufacturing system, may fabricate the 3D object from any suitable type of material such as polyphthalamide, polypropylene, thermoplastic urethane, thermoplastic polyurethane, polyether block amide (e.g., PA11, PA12), and/or the like. In some examples, the fabrication components of the 3D fabrication system may selectively apply a binding agent and/or fusing agent onto build material powder to fabricate the object. In addition or alternatively, the fabrication components may include an energy source that may selectively apply energy onto build material powder to fabricate the object. The fabrication components may alternatively include other types of components that may fabricate the 3D object through an additive manufacturing technique.

Figure 3:
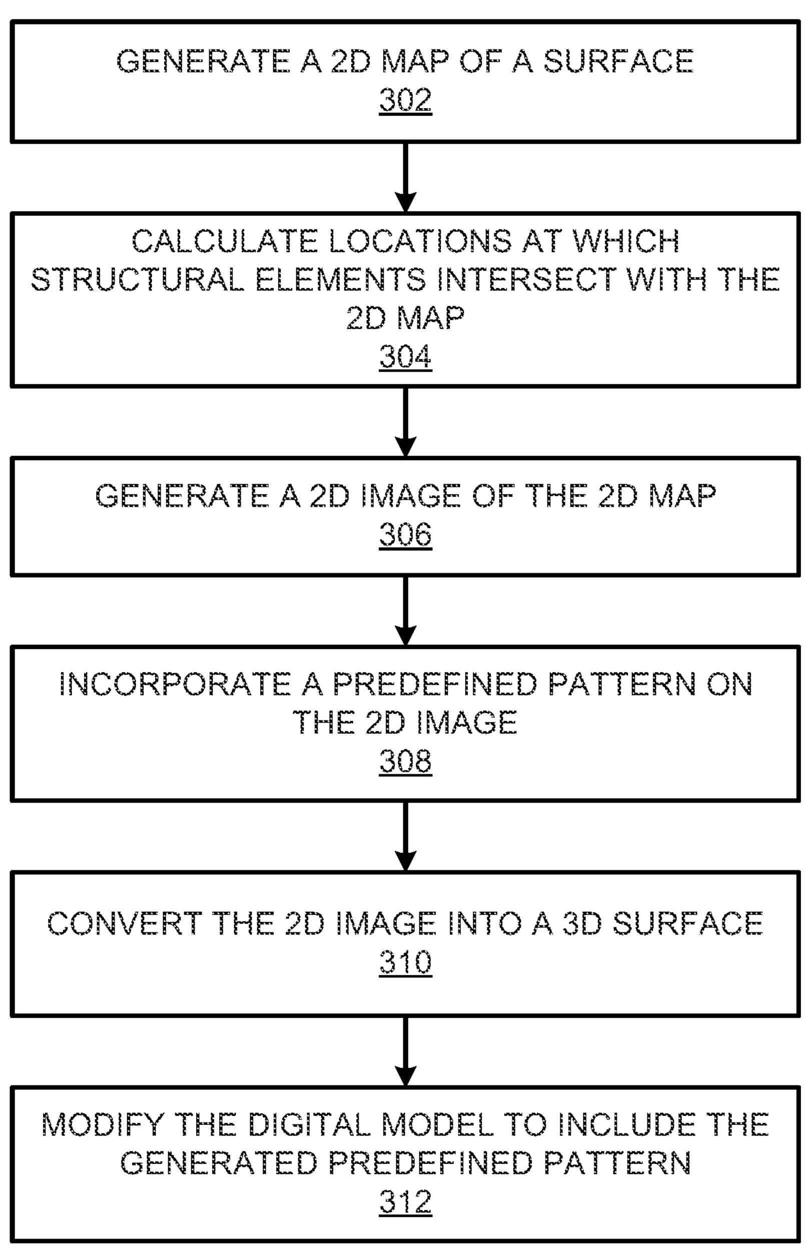
FIG. 3 depicts a flow diagram of an example method for modifying a digital model of a 3D object to include a generated predefined pattern.

Various manners in which a processor 402 may execute the instructions 102-114 are discussed in greater detail with respect to the method 300 depicted in FIG. 3. Particularly, FIG. 3 depicts a flow diagram of an example method 300 for modifying a digital model 200 of a 3D object to include a generated predefined pattern 222. It should be understood that the example method 300 may include additional operations and that some of the operations described herein may be removed and/or modified without departing from the scope of the method 300. The description of the method 300 is made with reference to the features depicted in FIGS. 1-2E for purposes of illustration.

At block 302, the processor 402 may generate a 2D map 210 of a surface 206 of a digital model 200 of a 3D object, in which the 3D object may include an internal lattice structure 202. As discussed herein, the processor 402 may generate, for instance, a UV map of the surface 206.

At block 304, the processor 402 may calculate locations 214 at which structural elements 204 in the internal lattice structure 202 intersect with the 2D map 210 of the surface 206. The structural element ends 208 intersecting with the 2D map 210 is shown in FIG. 2B.

At block 306, the processor 402 may generate a 2D image 220 including the calculated intersecting locations 214 and a perimeter 216 of the 2D map 210. At block 308, the processor 402 may incorporate a predefined pattern 222 on the 2D image 220. The predefined pattern 222 may connect a plurality of the calculated locations 214 to the perimeter 216 of the 2D map 210 of the surface 206 to provide structural support to the structural elements 204 in the lattice structure 202. In some examples, the processor 402 may incorporate the predefined pattern 222 to connect each of the calculated locations 214 with the perimeter 216 of the 2D map 210 of the surface 206. In addition, or alternatively, the processor 402 may incorporate the predefined pattern 222 through implementation of a neural style transfer, a triangulation, a manually input design incorporation operation, and/or the like.

At block 310, the processor 402 may convert the 2D image 220 with the generated predefined pattern 222 into a 3D surface of the digital model 200 of the 3D object. As discussed herein, the processor 402 may apply a thickness or multiple thicknesses to the pattern 222 following conversion of the 2D image 220 into the 3D surface 206. In some examples, the processor 402 may apply a common thickness across the pattern 222 while in other examples, the processor 402 may apply multiple thicknesses across the pattern 222 such that the pattern 222 may have a textured appearance. The thicknesses may correspond to various features across the pattern 222. For instance, the pattern 222 may include multiple colors and each of the colors may correspond to a particular thickness. As another example, the pattern 222 may include a plurality of grayscale values and each of the grayscale values may correspond to a particular thickness.

At block 312, the processor 402 may modify the digital model 200 of the 3D object to include the generated predefined pattern 222. As discussed herein, the processor 402 may modify the digital model 200 to be in a format that a 3D fabrication system may use to fabricate the 3D object. The processor 402 may also output the modified digital model 430 to a 3D fabrication system as discussed herein.

Some or all of the operations set forth in each of the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 4, there is shown an example apparatus 400 that may modify a digital model 200 of a 3D object to include a generated pattern 222 and may output the modified digital model 430. As discussed herein, a 3D fabrication system may fabricate the 3D object according to the modified digital model 430. It should be understood that the apparatus 400 may include additional features and that some of the features described herein may be removed and/or modified without departing from the scope of the apparatus 400.

According to examples, the apparatus 400 may be a computing device, such as a desktop computer, a laptop computer, a tablet computer, a server computer, and/or the like. In other examples, the apparatus 400 may be part of a 3D fabrication system, such as a controller of the 3D fabrication system. In any of these examples, the apparatus 400 may include a processor 402 that may control operations of the apparatus 400 and a memory 410 on which data that the processor 402 may access and/or may execute may be stored. The processor 402 may be a semiconductor-based microprocessor, a central processing unit (CPU), an application specific integrated circuit (ASIC), a field-programmable gate array (FPGA), and/or other hardware device. The memory 410, which may also be termed a computer readable medium, may be, for example, a Random Access memory (RAM), an Electrically Erasable Programmable Read-Only Memory (EEPROM), a storage device, or the like. The memory 410 may be a non-transitory computer readable storage medium, where the term "non-transitory" does not encompass transitory propagating signals. In any regard, the memory 410 may have stored thereon machine-readable instructions that the processor 402 may execute.

Although the apparatus 400 is depicted as having a single processor 402, it should be understood that the apparatus 400 may include additional processors and/or cores without departing from a scope of the apparatus 400. In this regard, references to a single processor 402 as well as to a single memory 410 may be understood to additionally or alternatively pertain to multiple processors 402 and multiple memories 410. In addition, or alternatively, the processor 402 and the memory 410 may be integrated into a single component, e.g., an integrated circuit on which both the processor 402 and the memory 410 may be provided. In addition, or alternatively, the operations described herein as being performed by the processor 402 may be distributed across multiple apparatuses 400 and/or multiple processors 402.

As shown in FIG. 4, the memory 410 may have stored thereon instructions 412-424 that the processor 402 may execute. Although the instructions 412-424 are described herein as being stored on the memory 410 and may thus include a set of machine-readable instructions, the apparatus 400 may include hardware logic blocks that may perform functions similar to the instructions 412-424. For instance, the processor 402 may include hardware components that may execute the instructions 412-424. In other examples, the apparatus 400 may include a combination of instructions and hardware logic blocks to implement or execute functions corresponding to the instructions 412-424. In any of these examples, the processor 402 may implement the hardware logic blocks and/or execute the instructions 412-424. As discussed herein, the apparatus 400 may also include additional instructions and/or hardware logic blocks such that the processor 402 may execute operations in addition to or in place of those discussed herein.

The processor 402 may fetch, decode, and execute the instructions 412 to generate a two-dimensional (2D) map 210 of a surface 206 of a digital model 200 of a three-dimensional (3D) object, in which the 3D object includes an internal lattice structure 202. The processor 402 may fetch, decode, and execute the instructions 414 to calculate locations 214 at which structural elements 204 in the internal lattice structure 202 intersect with the 2D map 210. The processor 402 may fetch, decode, and execute the instructions 416 to generate a 2D image 220 including the calculated locations 214 and a perimeter 216 of the 2D map 210.

The processor 402 may fetch, decode, and execute the instructions 418 to incorporate a predefined pattern 222 on the 2D image 220. The predefined pattern 222 may connect a plurality of the calculated locations 214 to the perimeter 216 of the 2D map 210 of the surface 206 to provide structural support to the structural elements 204 in the lattice structure 202 when the 3D object is fabricated with the predefined pattern 222.

The processor 402 may fetch, decode, and execute the instructions 420 to convert the 2D image 220 with the generated predefined pattern 222 into a 3D surface of the digital model 200 of the 3D object. As discussed herein, the processor 402 may apply a thickness or multiple thicknesses to the pattern 222 following conversion of the 2D image 220 into the 3D surface 206. The processor 402 may fetch, decode, and execute the instructions 422 to modify the digital model 200 of the 3D object to include the generated pattern. The processor 402 may also store the modified digital model 430 in a locally connected data store (not shown) and/or a remotely located data storage device.

The processor 402 may fetch, decode, and execute the instructions 424 to output the modified digital model 430 of the 3D object with the 3D surface having the predefined pattern, wherein the 3D object is to be fabricated based on the modified digital model 430.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium storing machine-readable instructions that when executed by a processor, cause the processor to:

access a digital model of a three-dimensional (3D) object including a lattice structure formed of structural elements, wherein a 3D fabrication system is to fabricate the 3D object;

generate a two-dimensional (2D) map of a surface of the digital model;

calculate locations at which the structural elements in the lattice structure intersect with the 2D map of the surface;

generate a 2D image including the calculated locations and a perimeter of the 2D map of the surface;

generate a pattern onto the 2D image, wherein the generated pattern connects and covers a plurality of the calculated locations;

convert the 2D image with the generated pattern into a 3D surface of the digital model; and modify the digital model of the 3D object to include the generated pattern.

2. The non-transitory computer-readable medium of claim 1, wherein the pattern is generated onto the 2D image to further:

connect a set of the calculated locations with the perimeter of the 2D image.

3. The non-transitory computer-readable medium of claim 1, wherein:

the pattern is generated through implementation of neural style transfer, triangulation, or manually input design.

4. The non-transitory computer-readable medium of claim 1, wherein the machine-readable instructions, when executed by the processor, further cause the processor to:

following conversion of the 2D image into the 3D surface of the digital model, apply a thickness to the generated pattern in the 2D image as converted into the 3D surface.

5. The non-transitory computer-readable medium of claim 1, wherein the generated pattern includes a plurality of colors, and wherein to convert the 2D image into the 3D surface of the digital model, the machine-readable instructions, when executed by the processor, cause the processor to:

apply multiple thicknesses to the generated pattern in the 2D image, wherein each of the multiple thicknesses corresponds to one of the plurality of colors.

6. The non-transitory computer-readable medium of claim 1, wherein the generated pattern includes a plurality of grayscale values and wherein to convert the 2D image into the 3D surface of the digital model, the machine-readable instructions, when executed by the processor, further cause the processor to:

apply multiple thicknesses to the generated pattern in the 2D image, wherein each of the multiple thicknesses respectively corresponds to one of the plurality of grayscale values.

7. The non-transitory computer-readable medium of claim 1, wherein the machine-readable instructions, when executed by the processor, further cause the processor to:

output the modified digital model, wherein the 3D fabrication system to fabricate the 3D object with the generated pattern based on the modified digital model.

8. The non-transitory computer-readable medium of claim 1, wherein the machine-readable instructions, when executed by the processor, further cause the processor to:

cause the 3D fabrication system to fabricate the 3D object with the generated pattern based on the modified digital model.

9. A method comprising:

generating, by a processor, a two-dimensional (2D) map of a surface of a digital model of a three-dimensional (3D) object, wherein the 3D object includes an internal lattice structure;

calculating, by the processor, locations at which structural elements in the internal lattice structure intersect with the 2D map of the surface;

generating, by the processor, a 2D image including the calculated locations and a perimeter of the 2D map of the surface;

incorporating, by the processor, a predefined pattern on the 2D image, wherein the predefined pattern connects a plurality of the calculated locations to the perimeter of the 2D map of the surface to provide structural support to the structural elements in the internal lattice structure;

converting, by the processor, the 2D image with the predefined pattern into a 3D surface of the digital model of the 3D object;

modifying, by the processor, the digital model of the 3D object to include the predefined pattern; and causing 3D fabrication system to fabricate the 3D object with the predefined pattern based on the modified digital model.

10. The method of claim 9, wherein incorporating the predefined pattern on the 2D image comprises incorporating the predefined pattern to connect each of the calculated locations with the perimeter of the 2D map of the surface.

11. The method of claim 9, wherein incorporating the predefined pattern on the 2D image comprises incorporating the predefined pattern through implementation of a neural style transfer, a triangulation, or a manually input design incorporation operation.

12. The method of claim 9, wherein the predefined pattern includes a plurality of colors, and wherein converting the 2D image with the predefined pattern on the 2D image comprises:

applying multiple thicknesses to the predefined pattern in the 2D image to convert the 2D image into the 3D surface of the digital model, wherein each of the multiple thicknesses corresponds to one of the plurality of colors.

13. The method of claim 9, wherein the predefined pattern includes a plurality of grayscale values, and wherein converting the 2D image with the predefined pattern on the 2D image comprises:

applying multiple thicknesses to the predefined pattern in the 2D image to convert the 2D image into the 3D surface of the digital model, wherein each of the multiple thicknesses respectively corresponds to one of the plurality of grayscale values.

14. An apparatus comprising:

a processor: and a memory storing instructions that when executed by the processor, cause the processor to:

generate a two-dimensional (2D) map of a surface of a digital model of a three-dimensional (3D) object, wherein the 3D object includes an internal lattice structure;

calculate locations at which structural elements in the internal lattice structure intersect with the 2D map;

generate a 2D image including the calculated locations and a perimeter of the 2D map;

incorporate a predefined pattern on the 2D image, wherein the predefined pattern connects a plurality of the calculated locations to the perimeter of the 2D map of the surface to provide structural support to the structural elements in the internal lattice structure when the 3D object is fabricated with the predefined pattern;

convert the 2D image with the predefined pattern into a 3D surface of the digital model of the 3D object;

modify the digital model of the 3D object to include the predefined pattern; and output the modified digital model of the 3D object with the 3D surface having the predefined pattern, wherein the 3D object is to be fabricated based on the modified digital model.

15. The apparatus of claim 14, wherein the predefined pattern includes a plurality of colors, and wherein to convert the 2D image with the predefined pattern into the 3D surface of the digital model, the instructions, when executed by the processor, cause the processor to:

apply multiple thicknesses to the predefined pattern in the 2D image, wherein each of the multiple thicknesses corresponds to one of the plurality of colors.

16. The apparatus of claim 14, wherein the predefined pattern includes a plurality of grayscale values, and wherein to convert the 2D image with the predefined pattern into the 3D surface of the digital model, the instructions, when executed by the processor, cause the processor to:

apply multiple thicknesses to the predefined pattern in the 2D image, wherein each of the multiple thicknesses respectively corresponds to one of the plurality of grayscale values.

17. The apparatus of claim 14, wherein the instructions, when executed by the processor, further cause the processor to:

cause a 3D fabrication system to fabricate the 3D object with the 3D surface having the predefined pattern based on the modified digital model.

* * * * *